(12) United States Patent
Seong et al.

(10) Patent No.: US 9,203,074 B2
(45) Date of Patent: Dec. 1, 2015

(54) RECHARGEABLE BATTERY WITH CAP PLATE HAVING A PROTRUSION AND TERMINAL PLATE HAVING A LONGITUDINAL COMPRESSION

(75) Inventors: Jae-Il Seong, Yongin-si (KR); Hideaki Yoshio, Yongin-si (KR); Ki-Youn Jeon, Yongin-si (KR); Kyung-Kyun Lee, Yongin-si (KR); Ji-Wan Jeong, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 410 days.

(21) Appl. No.: 13/609,998

(22) Filed: Sep. 11, 2012

(65) Prior Publication Data
US 2013/0136962 A1    May 30, 2013

(30) Foreign Application Priority Data
Nov. 30, 2011    (KR) .................. 10-2011-0126932

(51) Int. Cl.
*H01M 2/34* (2006.01)
*H01M 2/04* (2006.01)
*H01M 2/18* (2006.01)
*H01M 2/06* (2006.01)

(52) U.S. Cl.
CPC ............ *H01M 2/347* (2013.01); *H01M 2/0404* (2013.01); *H01M 2/18* (2013.01); *H01M 2/06* (2013.01); *H01M 2200/00* (2013.01)

(58) Field of Classification Search
None
See application file for complete search history.

(56) References Cited

U.S. PATENT DOCUMENTS

2006/0051667 A1    3/2006    Kim
2006/0093907 A1*   5/2006    Jeon et al. .................... 429/180
2009/0317665 A1    12/2009   Maeng et al.

FOREIGN PATENT DOCUMENTS

KR    10-2006-0011315    2/2006
KR    10-2009-0132926    12/2009

* cited by examiner

*Primary Examiner* — Ula C Ruddock
*Assistant Examiner* — Tony Chuo
(74) *Attorney, Agent, or Firm* — Knobbe Martens Olson & Bear LLP

(57) ABSTRACT

Embodiments of a rechargeable battery include: an electrode assembly including first and second leads; a case for receiving the electrode assembly; a cap plate covering an opening of the case, connected to the first lead, and including a terminal hole; and an insulating terminal plate provided between the cap plate and the electrode assembly, connected to the second lead, and an electrode end installed in the terminal hole. The cap plate may include a protrusion oriented toward the electrode assembly. The terminal plate may include an extended unit extended to an external part of the protrusion with respect to the terminal hole and separated from the protrusion. The protrusion and the extended unit may be provided on a plane in parallel with the opening. A first distance between the terminal hole and the protrusion may be shorter than a second distance between the terminal hole and the extended unit.

11 Claims, 5 Drawing Sheets

RECHARGEABLE BATTERY WITH CAP PLATE HAVING A PROTRUSION AND TERMINAL PLATE HAVING A LONGITUDINAL COMPRESSION

CROSS-REFERENCE TO RELATED APPLICATIONS

This application claims priority to and the benefit of Korean Patent Application No. 10-2011-0126932, filed in the Korean Intellectual Property Office on Nov. 30, 2011, the entire contents of which are incorporated herein by reference.

BACKGROUND

1. Field

Embodiments of the described technology relate generally to a rechargeable battery for inducing an external short circuit under a longitudinal compression condition.

2. Description of the Related Art

Unlike a primary battery, a rechargeable battery (i.e., a secondary battery) can be repeatedly recharged and discharged. Typical rechargeable batteries include a nickel-hydrogen battery, a lithium battery, a lithium ion battery, and the like. The rechargeable battery is manufactured in the form of a pack, and is commonly employed for mobile electronic devices such as cellular phones, notebook computers, and camcorders.

The rechargeable battery includes an electrode assembly that is spiral-wound in a jelly roll form by stacking a positive electrode and a negative electrode with a separator interposed therebetween, a case that houses the electrode assembly together with an electrolyte solution, and a cap plate that seals an upper opening of the case, as well as an electrode terminal installed in the cap plate and electrically connected to the electrode assembly.

For example, the case is formed as a cylinder or a rectangle made of aluminum or an aluminum alloy. The rechargeable battery generates heat under a predetermined condition in which a rectangular case is compressed and transformed by an external impact and pressure applicable in a vertical direction with respect to an up and down direction of the case, that is, the longitudinal compression condition.

Also, when no heat is generated, thermal runaway may secondarily occur in the rechargeable battery by a remaining current of an electrode assembly on a secondary impact under the longitudinal compression condition. Therefore, there is a need to short-circuit the rechargeable battery outside of the electrode assembly and discharge the current charged in the electrode assembly.

The above information disclosed in this Background section is only for enhancement of understanding of the background of the described technology and therefore it may contain information that does not form the prior art that is already known in this country to a person of ordinary skill in the art.

SUMMARY OF THE INVENTION

The described technology has been made in an effort to provide an embodiment of a rechargeable battery for discharging a remaining current charged in an electrode assembly by inducing an external short circuit under a longitudinal compression condition.

An embodiment provides a rechargeable battery including: an electrode assembly including a first lead and a second lead; a case for receiving the electrode assembly; a cap plate covering an opening of the case, connected to the first lead, and including a terminal hole; and a terminal plate provided between the cap plate and the electrode assembly in an insulated manner, connected to the second lead, and connected to an electrode end installed in the terminal hole. The cap plate includes a protrusion that is protruded toward the electrode assembly, the terminal plate includes an extended unit extended to an external part of the protrusion with respect to the terminal hole and separated from the protrusion, the protrusion and the extended unit are provided on a plane in parallel with the opening, and a first distance that is set to be the shortest between the terminal hole and the protrusion is shorter than a second distance that is set between the terminal hole and the extended unit.

The protrusion is protruded from an internal side of the cap plate in a first direction toward the electrode assembly, and the extended unit is extended in a second direction crossing the first direction within a protruding range of the protrusion.

The extended unit includes a first extended unit and a second extended unit that are protruded in the second direction on both sides of the third direction crossing the second direction on one side of the second direction of the terminal plate.

The terminal plate includes an installed unit connected to the electrode end when the extended unit is provided, and a supported unit formed to be narrower than the installed unit and extended to an opposite side of the extended unit.

Embodiments of the rechargeable battery further include: an insulating plate provided between the cap plate and the terminal plate. The insulating plate includes a bottom provided between the terminal plate and the cap plate; and a side wall protruded on the bottom in an external part of the supported unit and supporting a side of the supported unit.

The installed unit and the supported unit form a width step in the third direction because of a width difference, and the width step is separated from the case by a predetermined gap or contacts the case.

The installed unit and the supported unit form a height step in the first direction because of a height difference, and the height step connects the width step and the supported unit in the first direction.

The installed unit includes a through hole that corresponds to the electrode end, and an internal side of the through hole and an external side of the electrode end contacting each other are combined through loose insertion.

The insulating plate forms the bottom with a height step in the first direction and is combined to an internal side of the cap plate.

The installed unit and the supported unit are formed with a height step in the first direction and are combined to an internal side of the insulating plate.

The rechargeable battery further includes an insulating case for electrically insulating the electrode assembly and the cap plate.

Another embodiment provides a rechargeable battery including: an electrode assembly for performing a charge and discharge operation; a case for receiving the electrode assembly; a cap plate for sealing an opening of the case; an electrode end installed in a terminal hole of the cap plate when an insulating gasket is provided; and a terminal plate installed in an internal side of the cap plate when an insulating plate is provided, and electrically connecting the electrode terminal and the electrode assembly, where the cap plate forms a protrusion that is protruded in a first direction on one surface, and the terminal plate includes an extended unit protruded in a second direction crossing the first direction and separated from the protrusion by a predetermined gap within a protruding range of the protrusion.

The protrusion is formed to be protruded in the internal side of the cap plate on one side of the terminal hole in the second direction, and the terminal plate is disposed inside the cap plate.

The extended unit includes a first extended unit and a second extended unit protruded in the second direction on both sides of a third direction crossing the second direction on one side of the second direction of the terminal plate.

According to the embodiments, a protrusion is formed on a cap plate and an extended unit is installed on a terminal plate to short-circuit the rechargeable battery by contacting the extended unit on the protrusion under the longitudinal compression condition, thereby discharging the current of the electrode assembly. Therefore, when a secondary impact is applied under the longitudinal compression condition, thermal runaway of the electrode assembly caused by the remaining current can be prevented.

In a further embodiment, a rechargeable battery is provided. The rechargeable battery includes an electrode assembly positioned within a case. The rechargeable battery also includes a cap plate covering an opening of the case, wherein the cap plate comprises a terminal hole and at least one protrusion directed towards the electrode assembly. The rechargeable battery additionally includes a terminal plate provided between the cap plate and the electrode assembly and mounted about the terminal hole, wherein the terminal plate comprises an extended unit having at least one arm separated from the protrusion. The terminal plate and the cap plate are in electrical communication with opposing polarity electrodes of the electrode assembly. The terminal plate is configured such that the at least one arm contacts the at least one protrusion when case is subjected to a selected longitudinal compression.

The terminal plate is configured to rotate about the terminal hole when subjected to a longitudinal compression.

The cap plate includes one protrusion and wherein the extended unit comprises two arms positioned on opposing sides of the protrusion.

The cap plate includes two protrusions and the extended unit includes one arm positioned between the two protrusions.

The cap plate and terminal plate are electrically connected to opposite polarity electrodes of the electrode assembly and wherein contact of the at least one arm and the at least one protrusion discharges current remaining in the electrode assembly through the at least one arm.

The rechargeable battery does not substantially generate heat after being subjected to a longitudinal compression greater than or equal to the selected longitudinal compression.

DETAILED DESCRIPTION

Figure 1:
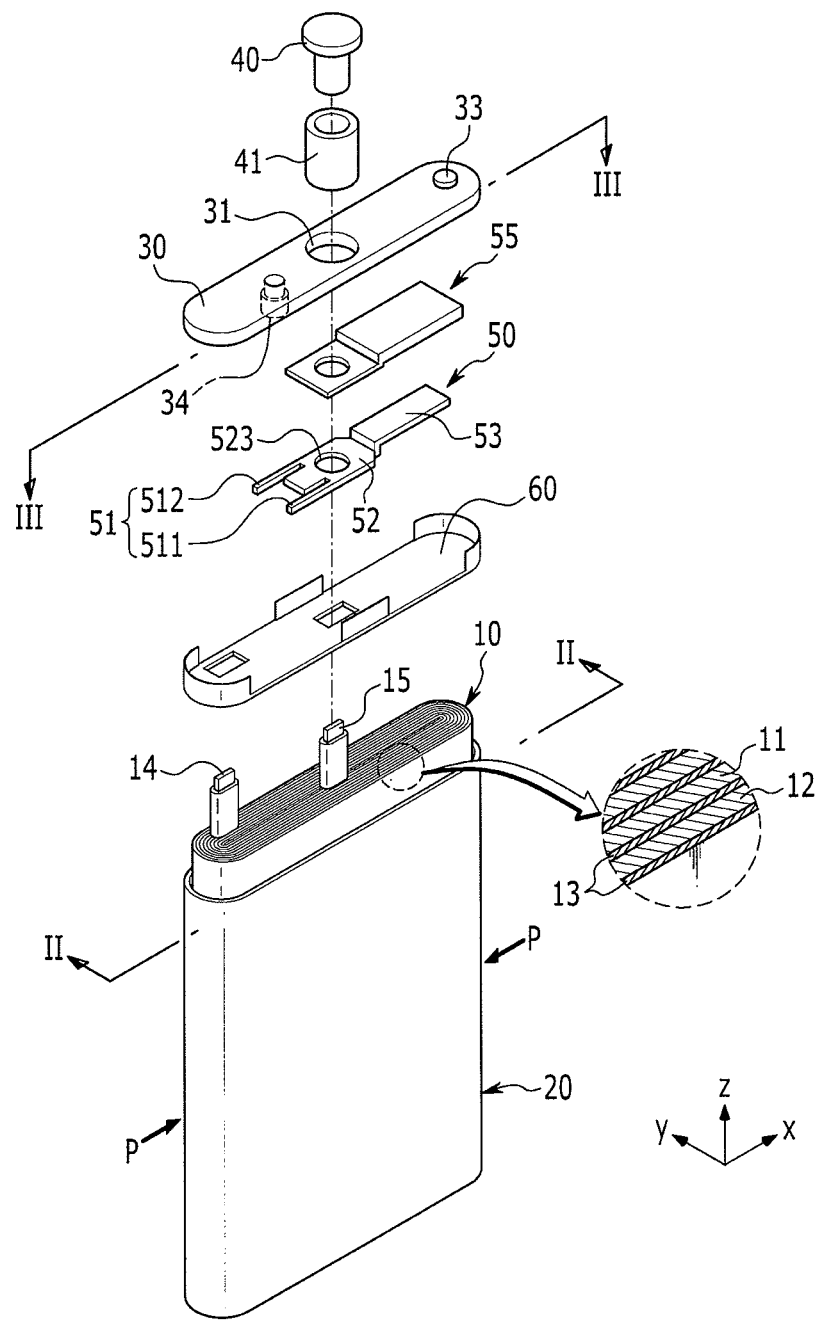
FIG. 1 shows an exploded perspective view of a rechargeable battery according to an exemplary embodiment of the present invention.

Embodiments of the present disclosure will be described more fully hereinafter with reference to the accompanying drawings, in which exemplary embodiments are shown. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

Figure 2:
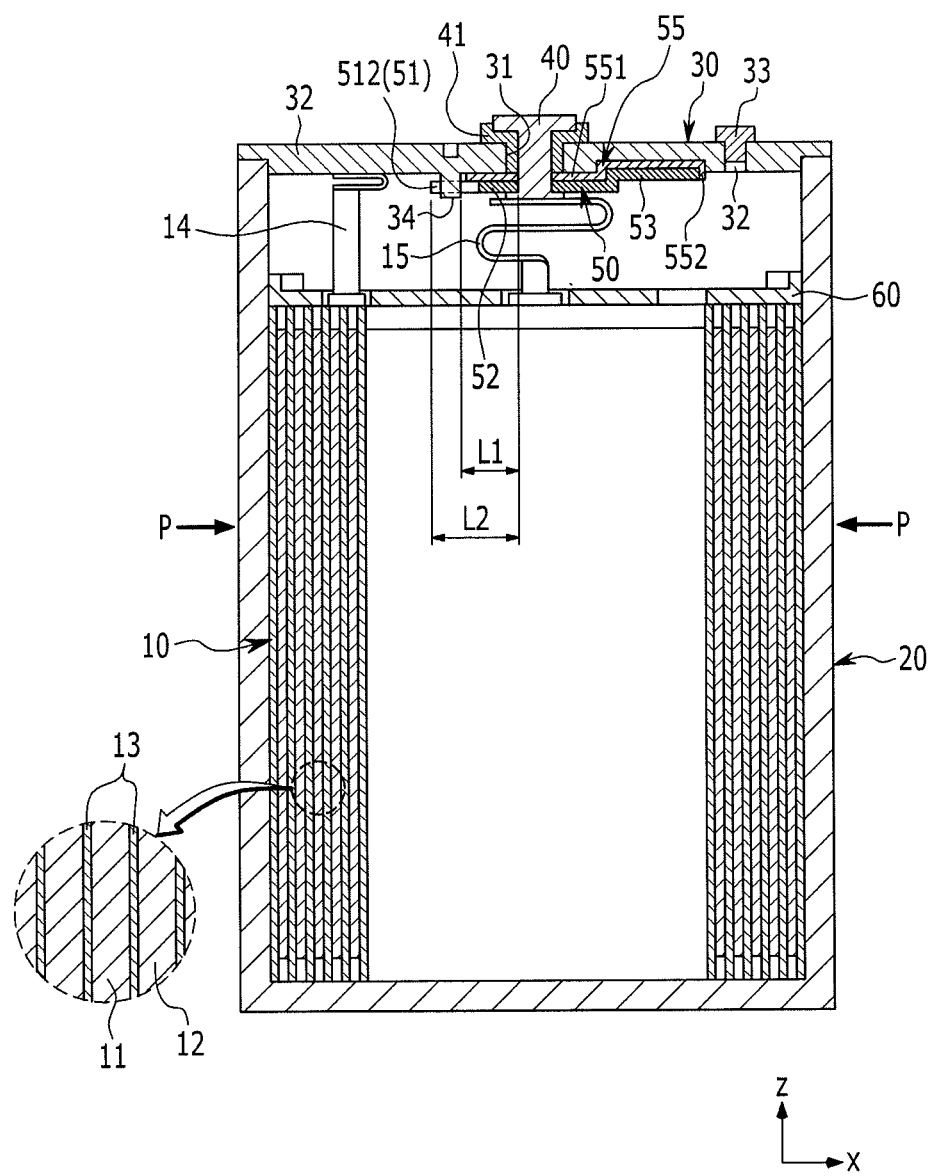
FIG. 2 shows a cross-sectional view of a state in which a rechargeable battery shown in FIG. 1 is combined with respect to a line II-II.

FIG. 1 shows an exploded perspective view of a rechargeable battery according to an embodiment of the present disclosure, and FIG. 2 shows a cross-sectional view of a state in which a rechargeable battery shown in FIG. 1 is combined with respect to a line II-II.

Referring to FIG. 1 and FIG. 2, the rechargeable battery includes an electrode assembly 10 for charging and discharging a current, a case 20 for receiving the electrode assembly 10 with an electrolyte solution, a cap plate 30 for sealing a top opening of the case 20, an electrode end 40 provided in a terminal hole 31 of the cap plate 30, a terminal plate 50 mounted about the terminal hole 31 for electrically connecting the electrode end 40 to the electrode assembly 10, and an insulating case 60 for electrically insulating the electrode assembly 10 from the cap plate 30.

The electrode assembly 10 includes a shape that corresponds to an inner space of the rectangular case 20 so that it may be inserted into the case 20. The case 20 receives the electrode assembly 10 through an opening, and it is formed with a conductor so that it may function as an electrode end. For example, the case 20 can be formed with aluminum or an aluminum alloy.

The electrode assembly 10 is formed by stacking a positive electrode 11 and a negative electrode 12 on both sides of a separator 13 which is an electrical insulating material, with the separator 13 therebetween, and spirally winding them. The electrode assembly 10 includes a positive electrode lead 14 connected to the positive electrode 11 and a negative electrode lead 15 connected to the negative electrode 12.

The positive electrode lead 14 is connected to the bottom of the cap plate 30 through welding, and the case 20 is electrically connected to the positive electrode 11 of the electrode assembly 10 through the cap plate 30 to function as a positive electrode terminal.

The negative electrode lead 15 is connected to the bottom of the terminal plate 50 connected to a first end of the electrode end 40 through welding, and the electrode end 40 provided in the terminal hole 31 of the cap plate 30 is electrically connected to the negative electrode 12 of the electrode assembly 10 to function as a negative terminal.

In an alternative embodiment, the negative electrode lead is connected to the cap plate so that the case may function as a negative terminal, and the positive electrode lead is connected to the electrode end so that the electrode end may function as a positive electrode terminal (not shown).

The electrode end 40 is inserted into the terminal hole 31 of the cap plate 30 when an insulating gasket 41 is provided. That is, the insulating gasket 41 electrically insulates the terminal hole 31 from the electrode end 40, and forms a sealing structure between the terminal hole 31 and the electrode end 40.

The terminal plate 50 is electrically connected to the electrode end 40 when an insulating plate 55 is provided. That is, the insulating plate 55 electrically insulates the cap plate 30 from the terminal plate 50 and forms a sealing structure between the cap plate 30 and the terminal plate 50.

The insulating case 60 is installed between the electrode assembly 10 and the terminal plate 50 to electrically insulate the positive electrode 11 of the electrode assembly 10 from the negative terminal plate 50.

The cap plate 30 includes an electrolyte injection opening 32. The electrolyte injection opening 32 combines the cap plate 30 and the case 20 to allow the electrolyte solution to be injected into the case 20. When the electrolyte solution is injected, the electrolyte injection opening 32 is sealed by a sealing stopper 33.

The rechargeable battery can be exposed to a longitudinal compression condition in which an external impact or pressure (P) works in one or both sides of the case 20 (e.g., x-axis direction). The rechargeable battery short-circuits the positive and negative electrodes 11 and 12 outside the electrode assembly 10 under the longitudinal compression condition to discharge the remaining current charged in the electrode assembly 10.

The rechargeable battery short-circuits the electrode assembly 10 between the insulating case 60 and the cap plate 30 and substantially discharges the remaining current of the electrode assembly 10, thereby preventing the thermal runaway when a secondary impact is applied.

Figure 3:
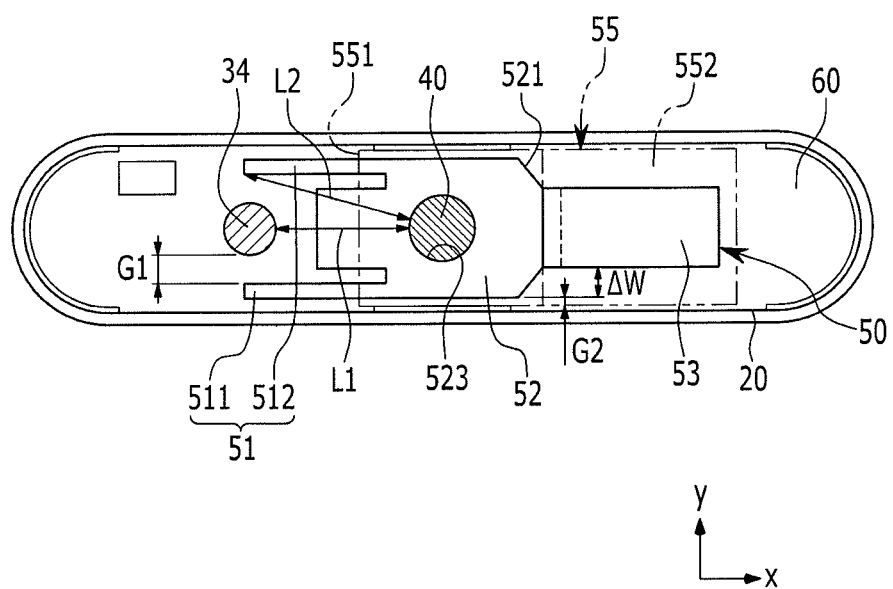
FIG. 3 shows a cross-sectional view with respect to a line III-III of FIG. 1.

FIG. 3 shows a cross-sectional view with respect to a line III-III of FIG. 1. FIG. 3 shows a disposal of the terminal plate 50 applicable to a rechargeable battery of FIG. 1. Referring to FIG. 1 to FIG. 3, the cap plate 30 includes a protrusion 34 that is protruded in a first direction (e.g., a z-axis direction) inside the cap plate 30. The terminal plate 50 includes an extended unit 51 that is extended in a second direction (e.g., x-axis direction) crossing the first direction.

Figure 5:
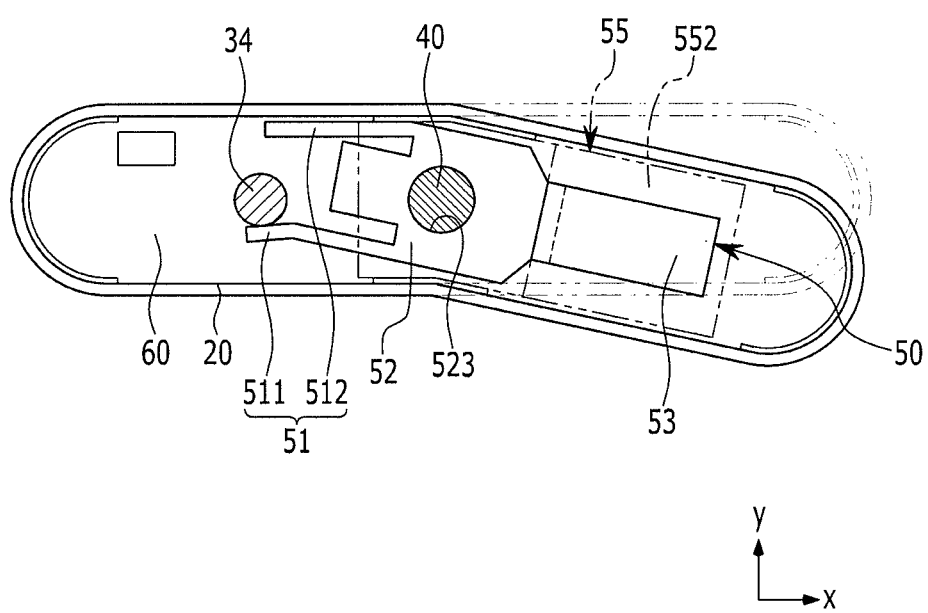
FIG. 5 shows a top plan view for indicating an operation state of a terminal plate under a longitudinal compression condition.

The extended unit 51 is separated from the protrusion 34 with a predetermined gap G1 in a normal rechargeable battery (refer to FIG. 3), and it can also contact the protrusion 34 or the inner wall of the case 20 in the rechargeable battery under the longitudinal compression condition (refer to FIG. 5).

For example, in an embodiment, one protrusion 34 is formed on one side of the electrode end 40, and the extended unit 51 is provided on both sides of the protrusion 34 (e.g., opposing sides). That is, the extended unit 51 includes one or more arms (e.g., a first extended unit 511 and a second extended unit 512) that are provided in a second direction (e.g., an x-axis direction) of the terminal plate 50.

On the contrary, in an alternative embodiment, one extended unit can be formed in the center of an installed unit on the terminal plate, and two protrusions can be formed corresponding to both sides of the extended unit on the cap plate (not shown).

The first extended unit 511 and the second extended unit 512 are protruded in the x-axis direction on both sides of a third direction (e.g., a y-axis direction) crossing the second direction (x-axis direction). That is, the first extended unit 511 can contact the protrusion 34 or the second extended unit 512 can contact the protrusion 34 according to the longitudinal compression condition.

That is, selective contacts of the protrusion 34 and the first and second extended units 511 and 512 can short-circuit the negative electrode 12 connected to the negative electrode lead 15 and the positive electrode 11 connected to the positive electrode lead 14 outside the electrode assembly 10.

In an embodiment, the protrusion 34 and the first and second extended units 511 and 512 are provided on a plane surface in parallel with an opening, and the first and second extended units 511 and 512 are provided within a protruded range of the protrusion 34 (e.g., distance G1). In an alternative embodiment, the protrusion 34 and the first and second extended units 511 and 512 can be provided on the same plane surface.

In an embodiment, a first length L1 is provided as the shortest length between an edge of the terminal hole (31, or electrode end 40) and an edge of the protrusion 34. A second length L2 may be provided that is set to be a length between an edge of the terminal hole 31 or electrode end 40 and the ends of the first and second extended units 511 and 512 (refer to FIG. 2 and FIG. 3). In further embodiments, the first length L1 may be shorter than the second length L2. Therefore, the first and second extended units 511 and 512 can contact the protrusion 34 under the longitudinal compression condition.

Further, the terminal plate 50 includes an installed unit 52 and a supported unit 53. The installed unit 52 is connected to the electrode end 40 when an extended unit 51 is provided, and the supported unit 53 is formed to be narrower than the installed unit 52 and is extended to the opposite side of the extended unit 51.

A width difference (ΔW) between the installed unit 52 and the supported unit 53 forms a width step 521 that is set in the third direction (y-axis direction). The width step 521 is separated from the case 20 with a predetermined gap G2 in the normal rechargeable battery, and it can contact the case 20 under the longitudinal compression condition.

In an embodiment, the gap G2 is shown to be less than the gap G1 in FIG. 3. However, in alternative embodiments, the gap G2 can be formed to be greater than the gap G1. The short-circuited positions are variable according to sizes of the gaps G1 and G2 and the longitudinal compression condition.

Figure 4:
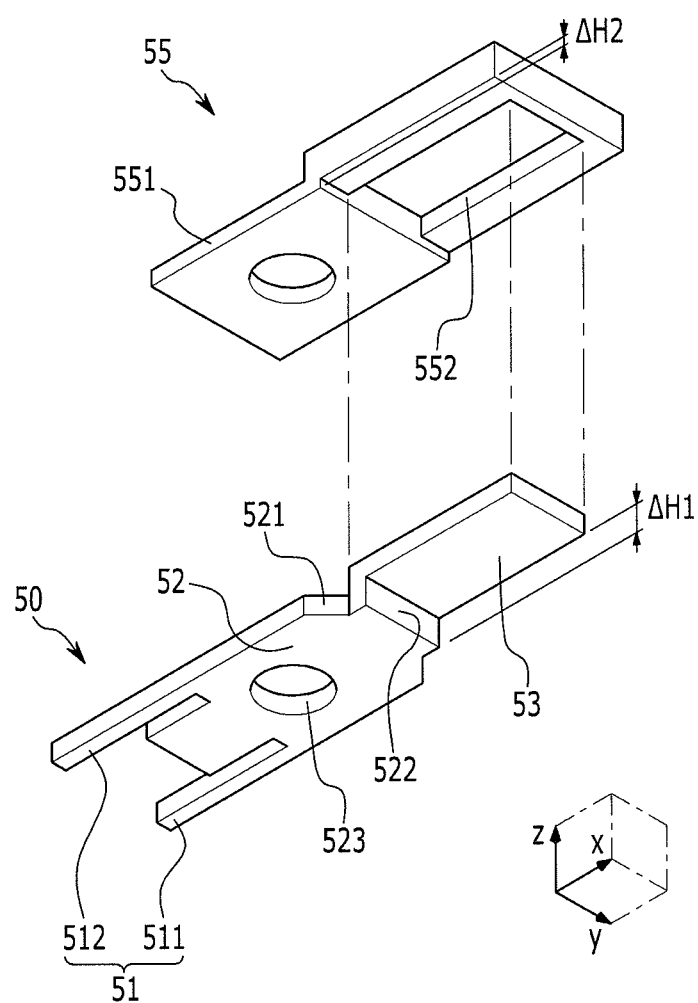
FIG. 4 shows an exploded perspective view of a terminal plate and an insulating plate shown in FIG. 3.

FIG. 4 shows an exploded perspective view of an embodiment of the terminal plate 50 and the insulating plate 55 shown in FIG. 3. Referring to FIG. 4, the installed unit 52 and the supported unit 53 form a height step 522 in the first direction (z-axis direction) because of a height difference ΔH1 on the terminal plate 50. The height step 522 connects the width step 521 on a lower side of the first direction (z-axis direction) and connects the supported unit 53 on an upper side thereof.

The installed unit 52 includes a through hole 523 that corresponds to the electrode end 40. When the electrode end 40 is inserted into the through hole 523, the external side of the electrode end 40 contacts the internal side of the through hole 523. In this instance, the internal side of the through hole 523 and the external side of the electrode end 40 are combined through loose insertion to thus allow relative rotation of the electrode end 40 and the installed unit 52 under the longitudinal compression condition.

Further, the insulating plate 55 includes a bottom 551 and a side wall 552 for supporting the terminal plate 50 in correspondence with the terminal plate 50. The bottom 551 is provided between the terminal plate 50 and the cap plate 30 and functions as an insulator and a sealer. The side wall 552 is protruded from the bottom 551 on an external part of the supported unit 53 and supports a side of the supported unit 53. That is, the side wall 552 forms a groove for receiving the supported unit 53 on the bottom 551.

The insulating plate 55 forms the bottom 551 with a height difference ΔH2 in the first direction (z-axis direction) so as to correspond to the terminal plate 50, and it is combined inside the cap plate 30. Therefore, the installed unit 52 and the supported unit 53 of the terminal plate 50 with a height difference ΔH1 can be tightly combined to the inside of the insulating plate 55.

The bottom 551, the side wall 552, and their height difference ΔH2 on the insulating plate 55 stably combine and support the installed unit 52 and the supported unit 53 of the terminal plate 50 under the longitudinal compression condition.

Therefore, the installed unit 52 and the supported unit 53 are stably rotated with respect to the electrode end 40 and through hole 523 to allow the first and second extended units 511 and 512 contacting the protrusion 34 and the case 20 to be bent.

FIG. 5 shows a top plan view for indicating an operation state of an embodiment of a terminal plate 50 under a longitudinal compression condition. Referring to FIG. 5, a rechargeable battery is bent to one side of the case 20 with respect to the electrode end 40 under the longitudinal compression condition.

The installed unit 52 of the terminal plate 50 is rotated in a bent direction of the case 20 with the electrode end 40 as a rotation point. In this instance, the supported unit 53 is stably rotated with a support by the side wall 552 of the insulating plate 55.

The extended unit 51 including the first and second extended units 511 and 512 provided to the installed unit 52 are rotated with respect to the electrode end 40 and contact the protrusion 34 and the case 20 when the case is subjected to a longitudinal compression greater than or equal to a selected longitudinal compression. Since the case 20 is positive, the terminal plate 50 connected to the negative electrode end 40 discharges the current remaining in the electrode assembly 10 outside the electrode assembly 10 through the first and second extended units 511 and 512.

Accordingly, the rechargeable battery according to an embodiment does not substantially generate heat after longitudinal compression (e.g., after being subjected to a longitudinal compression greater than or equal to the selected longitudinal compression) and does not substantially generate thermal runaway when an external impact or pressure is applied.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

While embodiments of the disclosure have been described in connection with what is presently considered to be practical exemplary embodiments, it is to be understood that the embodiments is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly including a first lead and a second lead;
   a case for receiving the electrode assembly that has a side wall;
   a cap plate covering an opening of the case, connected to the first lead, and including a terminal hole; and
   a terminal plate provided between the cap plate and the electrode assembly in an insulated manner, connected to the second lead, and connected to an electrode end installed in the terminal hole,
   wherein the cap plate includes a protrusion that is protruded toward the electrode assembly,
   wherein the terminal plate includes an extended unit extended to an external part of the protrusion with respect to the terminal hole and separated from the protrusion,
   wherein the protrusion and the extended unit are provided on a plane in parallel with the opening, and
   wherein a first distance that is the shortest distance between the terminal hole and the protrusion is shorter than a second distance that is between the terminal hole and an end of the extended unit and wherein the extended unit is spaced from the protrusion so as to be interposed between the protrusion and the side wall of the case.

2. The rechargeable battery of claim 1, wherein
   the protrusion is protruded from an internal side of the cap plate in a first direction toward the electrode assembly, and
   the extended unit is extended in a second direction crossing the first direction within a protruding range of the protrusion.

3. The rechargeable battery of claim 1, wherein the extended unit includes a first extended unit and a second extended unit that are protruded in the second direction on both sides of a third direction crossing the second direction on one side of the second direction of the terminal plate.

4. The rechargeable battery of claim 2, wherein the terminal plate includes
   an installed unit connected to the electrode end when the extended unit is provided, and
   a supported unit formed to be narrower than the installed unit and extended to an opposite side of the extended unit.

5. The rechargeable battery of claim 4, further including an insulating plate provided between the cap plate and the terminal plate wherein the insulating plate includes:
   a bottom provided between the terminal plate and the cap plate; and
   a side wall protruded on the bottom in an external part of the supported unit and supporting a side of the supported unit.

6. The rechargeable battery of claim 4, wherein
   the installed unit and the supported unit form a width step in a third direction crossing the second direction on one side of the second direction of the terminal plate because of a width difference, and
   the width step is separated from the case by a predetermined gap or contacts the case.

7. The rechargeable battery of claim 6, wherein
   the installed unit and the supported unit form a height step in the first direction because of a height difference, and
   the height step connects the width step and the supported unit in the first direction.

8. The rechargeable battery of claim 4, wherein
   the installed unit includes a through hole that corresponds to the electrode end, and
   an internal side of the through hole and an external side of the electrode end contacting each other are combined through loose insertion.

9. The rechargeable battery of claim 5, wherein the insulating plate forms the bottom with a height step in the first direction and is combined to an internal side of the cap plate.

10. The rechargeable battery of claim 9, wherein the installed unit and the supported unit are formed with a height step in the first direction and are combined to an internal side of the insulating plate.

11. The rechargeable battery of claim 1, further including an insulating case for electrically insulating the electrode assembly and the cap plate.

\* \* \* \* \*